No. 12,372. REISSUED JULY 11, 1905.
F. FERGUSON.
GARMENT SUPPORTER.
APPLICATION FILED NOV. 24, 1903.
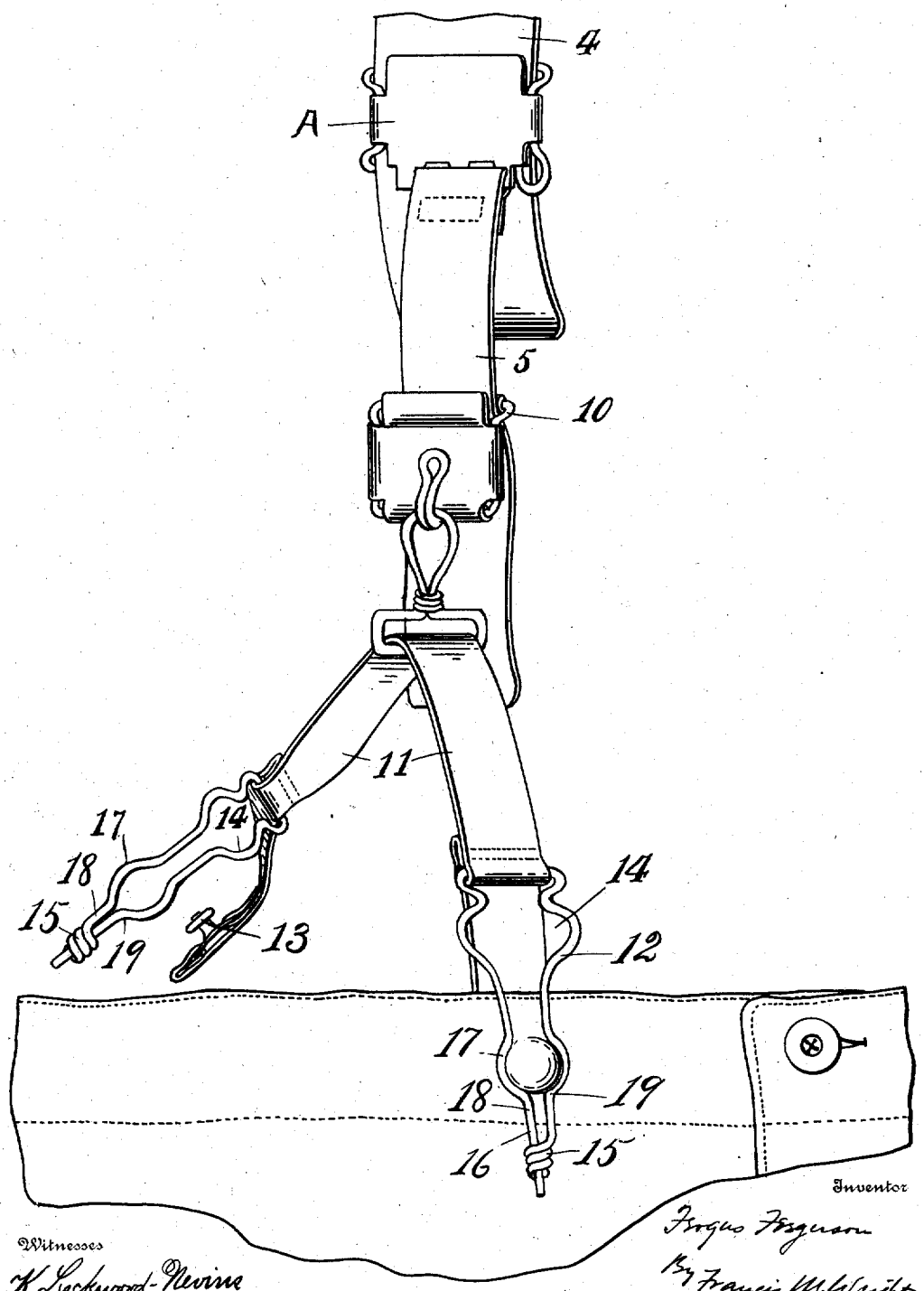
Witnesses
K. Lockwood-Nevins
Bessie Gorfinkel
Inventor
Fergus Ferguson
By Francis M. Wright
Attorney
PHOTO LITHOGRAPHED BY SUGNET & WILHELMS LITHO. & PTG. CO. NEW YORK No. 12,372 Reissued July 11, 1905.

UNITED STATES PATENT OFFICE.

FERGUS FERGUSON, OF SANTA ROSA, CALIFORNIA.

GARMENT-SUPPORTER.

SPECIFICATION forming part of Reissued Letters Patent No. 12,372, dated July 11, 1905.

Original No. 710,675, dated October 7, 1902. Application for reissue filed November 24, 1903. Serial No. 182,559.

*To all whom it may concern:*

Be it known that I, FERGUS FERGUSON, a citizen of the United States, residing at Santa Rosa, county of Sonoma, State of California, have invented an Improvement in Garment-Supporters; and I hereby declare the following to be a full, clear, and exact description of the same.

My invention relates to improvements in garment-supporting devices, particularly of the type used in conjunction with the ordinary trousers-suspenders of men.

It relates to that class of garment-supporters employing in combination a loop of sheet metal or wire and a stud to effect the engagement of the fabric and is especially designed so as to accommodate itself to fabrics varying greatly in thickness.

Heretofore garment-supporters employing a loop wide at the top and narrow at the bottom, in conjunction with a stud or button, have depended upon the elasticity of the upper portion of the loop for the engagement and grasping of the fabric—that is to say, when the button was grasped by the narrow lower portion of the loop the sides of the wide upper portion would spring out. In this construction the button would be brought quite close to the end of the loop when holding the fabric, and with such construction, since the loop is closed at the bottom, a small spreading or divergence of the lower portions of the sides of the loop would be greatly increased or multiplied at the upper portion of the loop. The extent of spreading or divergence of the lower portions of the sides of the loop was thus extremely limited, so that with this construction there was not sufficient accommodations for variations of thickness in the fabric. If the loop were constructed to grasp a thin fabric around the button, it could not stretch sufficiently to accommodate a thick fabric, and if made sufficiently wide at the lower end of the loop to accommodate a thick fabric it would not grasp with sufficient pressure a thin fabric around the button.

The object of my present invention is to provide a construction by which the above defects are avoided and by which either very thick or thin fabrics may be grasped equally well by the garment-supporter.

In the accompanying drawing the figure is a perspective view of my improved device shown as connected with a suspender-strap.

Having reference to the drawing, A represents the plate of a buckle which is adjustable on the suspender-strap 4. A strap 5, secured to the suspender-buckle, carries a buckle 10, to which a second strap 11 is held. The latter carries the members constituting the essential part of my invention and by which the garment to be supported is engaged. These members consist of an elastic-wire yoke 12, adapted to fit over a stud or button 13, carried on the strap. The method of fastening is to press the head of the stud against the cloth of the garment in the wider space 14 between the sides of the yoke to admit the cloth and button, then allow the latter to slip down between these sides, which will yield accordingly to allow even double thicknesses of heavy cloth to be held, yet at the same time the sides are near enough together to grip properly the finest fabric.

If desired, the sides of the yoke may be provided with the oppositely-disposed offsets 17, which allow greater accommodation for the button and cloth and prevent the button from being accidentally disengaged from the yoke.

Heretofore, so far as my knowledge extends, the sides of the yoke have terminated at this point—that is to say, immediately below the offset 17—the stud or button resting in the bottom of the loop. This construction did not permit of sufficient elasticity of divergence or spreading of the sides of the loop where they grasp the button. The consequence was that said sides if properly grasping a thin fabric could not accommodate a thick fabric. If sufficiently far apart to accommodate a thick fabric, they could not exert sufficient pressure on a thin fabric. I remedy this defect in the following manner: The sides of the yoke below the button-holding space are extended and are connected at a sufficient distance from said button-holding space to allow of a greater amount of divergence or spreading of the sides of the yoke at said button-holding space than heretofore, a sufficient divergence to accommodate thick fabrics around the button, if necessary, while at the same time exerting sufficient elastic pressure on thin fabrics. I preferably connect these lower ends of the sides of the yoke by forming one extension into a cylindrical part 15, in which the other extension 16 is slidable. As the yoke is preferably made of wire, the cylinder 15 is formed by suitably coiling one end of the wire, as shown. It will be seen that in this way there are formed shoulders 19 between said button-holding space and said extensions 18. These shoulders prevent any further downward movement of the button and are an essential part of my invention.

While the mode of connection here shown of the extensions of the side of the yoke is preferred by me, it is not an essential feature of my invention. What is essential is that the sides of the yoke should be extended sufficiently beyond the shoulders 19 to provide a sufficient elasticity of said sides at the button-holding space and also that the yoke should contain the shoulders 19 to prevent said button passing out of said space. It is to be understood, however, that the direction in which the sides of the yoke are extended or prolonged beyond the shoulders 19 is immaterial. All that is necessary is that said sides shall have sufficient extension in any direction to render said sides at the button-holding space sufficiently elastic to accommodate either thin or thick fabrics. It is necessary that the connection between said sides at their lower ends should be such as to prevent any appreciable lateral play beyond that obtained by the resiliency of the material composing the sides of the yoke, thereby retaining counter resistance enough to give a firm secure bind.

I claim—

1. A garment-supporter comprising supporting-straps and members on said straps by which a garment may be engaged, said members including an elastic-sided yoke having two substantially parallel members slidable relatively to each other in a direction longitudinally to the yoke, one of said members having a guide through which the other member is slidable, and a stud with which the garment is adapted to be engaged in the space between the members of the yoke, substantially as described.

2. In a garment-supporter, a yoke or holder adapted to receive a stud into the space between its sides, said holder having its lower portion extended to form substantially parallel members slidable relatively to each other in a direction longitudinally to the yoke, one of said members having a guide and the other member slidably engaging said guide, substantially as described.

3. In a garment-supporter, a yoke or holder adapted to receive a stud into the space between its sides said sides having each a portion extended in the direction of the length of the yoke and brought nearer together to form a contracted lower portion, said sides slidable relatively to each other in a direction longitudinally to the yoke and one of said extended portions having formed integrally therewith a cylindrical guide and the other extended portion slidable in said guide, substantially as described.

4. In a garment-supporter, the combination of a yoke or holder adapted to receive a stud into the space between its sides said stud having a hard body and a head and a yielding or soft covering therefor, and said yoke having its sides slidable relatively to each other in a direction longitudinally to the yoke, and one of said sides having a guide for the other side, substantially as described.

5. A garment-supporter comprising a button, a yoke or holder therefor, and means for suspending said yoke and button in proximity to each other, said yoke having an upper wide receiving-space for the button, and a contracted button-holding portion, the sides of the yoke having beyond the button-holding portion shoulders engaging the shank or under portion of the button to prevent slipping down of the button, said sides having extensions beyond said shoulders to afford elasticity to the sides at the button-holding portion, said extensions being connected at their ends, so as to prevent any appreciable lateral movement, beyond that obtained by the resiliency of the material comprising the sides of the yoke, substantially as described.

6. A garment-supporter comprising a button, a yoke or holder therefor, and means for suspending said yoke and button in proximity to each other, said yoke having an upper wide receiving-space for the button, and a contracted button-holding portion, the sides of the yoke having extensions to afford elasticity to the sides at the button-holding portion, said extensions being connected at their ends, so as to prevent any appreciable lateral movement, beyond that obtained by the resiliency of the material composing the sides of the yoke, and means between said button-holding portion and extensions, engaging the shank or under portion of the button to prevent slipping down of the same, substantially as described.

7. In a garment-supporter, in combination with a button, a loop provided with suitable means for supporting the same, and having an upper wide receiving-space for the button, and a contracted button-holding portion, said loop extending beyond the button-holding portion to afford resiliency to the sides of said portion and having shoulders between the button-holding portion and extension engaging the shank or under portion of the button to limit the downward movement of the button, substantially as described.

FERGUS FERGUSON.

Witnesses:

L. W. JUILLIARD,

F. McG. MARTIN.